(12) United States Patent
Breault

(10) Patent No.: US 7,429,429 B2
(45) Date of Patent: Sep. 30, 2008

(54) FUEL CELL WITH THERMAL CONDUCTANCE OF CATHODE GREATER THAN ANODE

(75) Inventor: Richard D. Breault, North Kingstown, RI (US)

(73) Assignee: UTC Power Corporation, South Windsor, CT (US)

( * ) Notice: Subject to any disclaimer, the term of this patent is extended or adjusted under 35 U.S.C. 154(b) by 484 days.

(21) Appl. No.: 10/859,014

(22) Filed: Jun. 2, 2004

(65) Prior Publication Data

US 2005/0271927 A1 Dec. 8, 2005

(51) Int. Cl.
*H01M 4/00* (2006.01)
(52) U.S. Cl. .......................... 429/40; 429/20
(58) Field of Classification Search ............. 429/20, 429/24
See application file for complete search history.

(56) References Cited

U.S. PATENT DOCUMENTS 6,572,997 B1 * 6/2003 Iqbal et al. .................... 429/34

2005/0112449 A1 * 5/2005 Mathias et al. ................ 429/44

* cited by examiner

*Primary Examiner*—Patrick Ryan
*Assistant Examiner*—Ben Lewis
(74) *Attorney, Agent, or Firm*—M. P. Williams

(57) ABSTRACT

In a fuel cell for a fuel cell power plant having a PEM (9), a cathode comprising at least a catalyst (10) and a support substrate (17), possibly with a diffusion layer (16), on one side of the PEM, and an anode comprising at least an anode support substrate (14) and an anode catalyst (11) on the opposite side of the PEM, and a porous water transport plate having reactant gas flow field channels (31, 32) (21, 28) adjacent to each of said support substrates as well as water flow channels (22) in at least one of said water transport plates, the thermal conductance of the cathode is less than about one-half of the thermal conductance of the anode, and preferably less than one-quarter of the thermal conductance of the anode, to promote flow of water from the cathode to the anode and to the adjacent water transport plate, obviating the need, in some cases, for water or reactant pressure pumps.

9 Claims, 2 Drawing Sheets

FUEL CELL WITH THERMAL CONDUCTANCE OF CATHODE GREATER THAN ANODE

TECHNICAL FIELD

This invention relates to polymer electrolyte, proton exchange membrane fuel cells in which the thermal conductance of the cathode substrate is less than half the thermal conductance of the anode substrate, so as to retard heat flow out of the cathode, thereby providing higher water vapor pressure relative to water in the water passageways (such as a water transport plate), and causing water to migrate from the higher temperature cathode to the lower temperature anode, thereby to remove product water from the cathode and to increase humidification of the membrane on the anode side.

BACKGROUND ART

In typical fuel cells, particularly polymer electrolyte, proton exchange membrane (PEM) fuel cells, the interaction between hydrogen fuel and an oxidant (such as air) produces heat, electricity and water. As is known, if the water is not removed from the cathode, it will block the oxidant gas from reaching the cathode catalyst, thereby degrading performance of the fuel cell system.

It is also known that inadequate humidity on the anode side of the PEM will cause ionomer degradation, reducing the useful life of the fuel cell.

Water management has thus far been most successful utilizing porous reactant flow field plates which, when the individual fuel cells are pressed together in a stack, include water transfer channels. The product water tends to flow through the porous plate into the water channels, the water being circulated externally, cooled, and sufficient water returned to the fuel cells. On the anode side, water flowing through the water channels migrates through the porous reactant gas flow field plate toward the anodes to keep the membrane from drying out. A system of this type is disclosed in U.S. Pat. Nos. 5,700,595 and 5,503,944.

Water management which involves circulating water necessarily requires a water pump as well as being subjected to operational problems in freezing temperatures. The net efficiency of a fuel cell power plant is reduced by electricity used to circulate the water, which is referred to typically as parasitic power.

In copending U.S. Pat. No. 6,794,077 B2, issued Sep. 21, 2004, there is disclosed a fuel cell system which does not circulate water externally of the fuel cell. In that case, the water flow channels are dead ended near the air inlet and drain directly into the air exit manifold.

In copending U.S. Pat. No. 6,916,571 B2, issued Jul. 12, 2005, water is circulated by means of convection, from gas bubbles that leak into the water flow fields and from the temperature differential between water within the stack and outside of the stack. In another embodiment in said application, water is not circulated but is allowed to bubble up from the bottom to the top of the cells and then out to ambient atmosphere. In each of these cases, with the water being at atmospheric pressure, the reactant gases must be pressurized in order to provide the pressure differential necessary for water to flow toward the water flow channels, as described in the aforementioned '944 patent. Thus, elimination of a water circulation pump does not necessarily reduce the parasitic power in such a case.

DISCLOSURE OF INVENTION

Objects of the invention include provision of fuel cell power plants: in which there is increased humidification of the anode side of the membrane; having a simpler configuration; with improved removal of product water from the cathode; having reduced parasitic power; operating without a water circulation pump; and avoiding any necessity to pressurize the reactant gases by means of pumps.

This invention is predicated in part on the observation that water tends to migrate from a higher temperature location to a lower temperature location, including migration through the PEM. The invention is further predicated in part on the observation that a higher temperature at the cathode increases the water vapor pressure thereat, which in turn improves water transport from the cathode catalyst through the porous reactant gas flow field plate to the water channels.

According to the present invention, fuel cells of a fuel cell power plant include cathode substrates which have through-plane thermal conductance that is at least 50% less than the through-plane thermal conductance of the anode substrates, and preferentially, in which the thermal conductance of the cathode substrates are less than 25% of the thermal conductance of the anode substrates.

According to the invention, the lower thermal conductance of the cathode substrate retards heat flow out of the cathode, so that the cathode is always warmer than the anode. This causes water to migrate through the PEM toward the anode, and also causes a higher water vapor pressure at the cathode itself than the water vapor pressure in the adjacent reactant gas flow field plate, such as a porous water transport plate, whereby water flows away from the cathode, both towards the cathode reactant gas flow field plate, and through the membrane to the anode.

In accordance with the invention, the thermal conductance, defined as the thermal conductivity of a material divided by its thickness, can be controlled by (a) selection of the heat treating temperature of the material, (b) by changing the thickness of the material, and, (c) in the case of catalyst layers or diffusion layers, by using carbon blacks with different structure indexes or different heat treat temperatures. Further, thermal conductance can be controlled by controlling the polymer content of the carbon black layers. The thermal conductivity of substrates can be increased by using a pitch based carbon fiber, or by using short milled fibers (on the order of 0.25 to 0.50 millimeters) versus using longer chopped fibers (on the order of about 5.0 millimeters to 10.0 millimeters).

In accordance with one embodiment of the invention, the through plane thermal conductance of the cathode should be less than about $3.3 \times 10^3$ W/m$^{2\circ}$ C. and preferably should be less than $1.7 \times 10^3$ W/m$^{2\circ}$ C.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
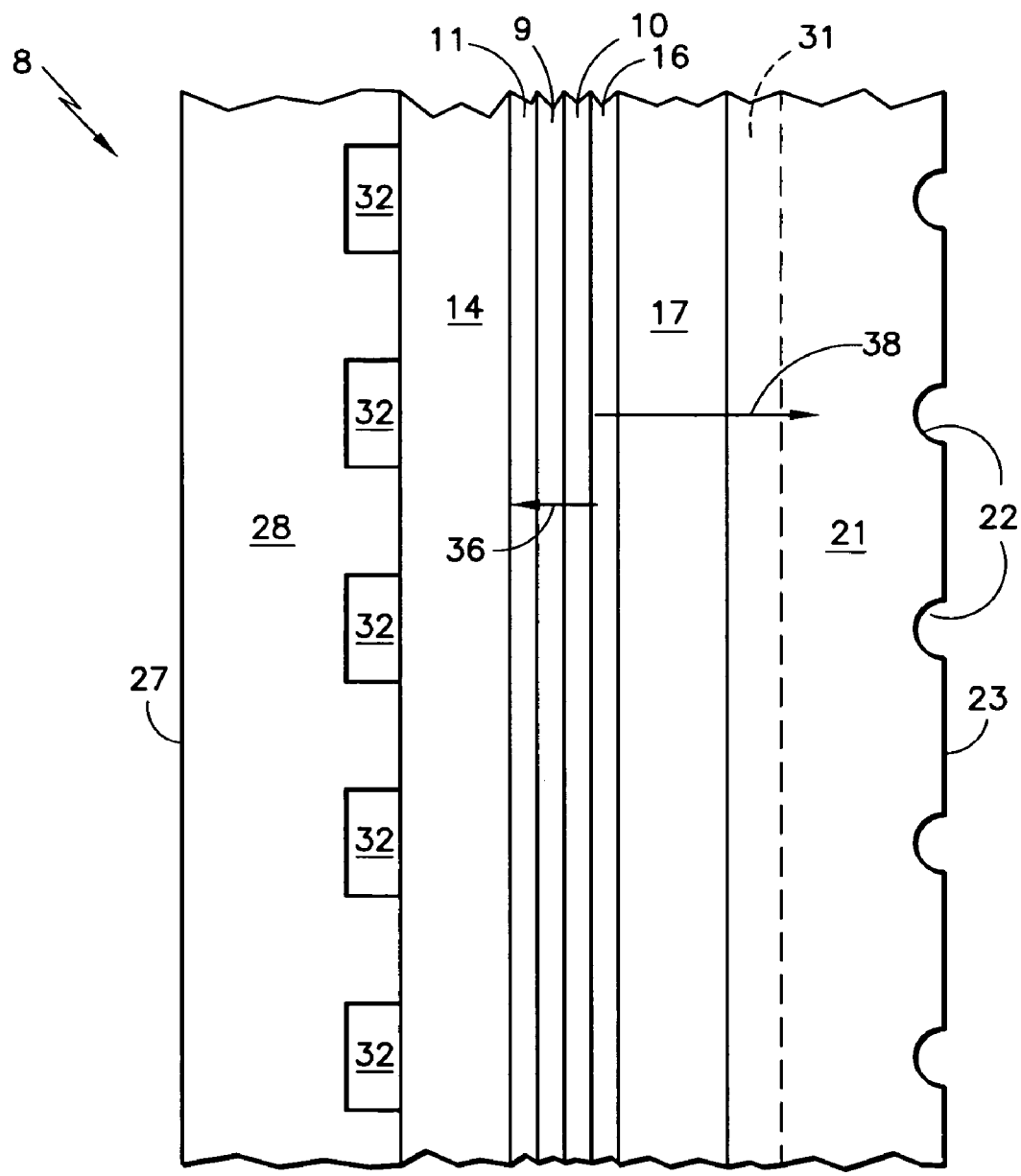
FIG. 1 is a fractional side elevation sectional view of a typical fuel cell, having thermal conductance of the anode much greater than that of the cathode in accordance with the invention, illustrating the improved water flow which results from the invention.

Referring to FIG. 1, a fuel cell 8, which typically is used in a stack with other fuel cells in a known fashion, includes a polymer electrolyte, proton exchange membrane 9 having a cathode catalyst 10 on one surface thereof and an anode catalyst 11 on an opposing surface thereof. The anode has a porous substrate 14 which may be hydrophilic, partially hydrophilic, or hydrophobic and may contain a diffusion layer (bi-layer) but in this embodiment does not have a diffusion layer. The cathode however has a diffusion layer 16 between a porous cathode substrate 17 and the cathode catalyst 10. Alternatively, the diffusion layer may be omitted from the cathode. The cathode substrate may be hydrophilic, partially hydrophilic, or hydrophobic as is known.

Adjacent each of the substrates is a porous reactant flow field plate, in this instance of the type referred to as a water transport plate. A cathode water transport plate 21 has water flow channels 22 in a surface 23 thereof, which, when the fuel cell 8 is adjacent to a similar fuel cell having a flat surface 27 on an anode water transport plate 28, will provide water flow channels. Or the water flow fields may be completed by the surface 23 being butted up against a flat surface of a solid separator plate or a cooler plate, all as is known; in such a case, the anode water transport plate 28 will have water flow channels similar to channels 22. Alternatively, the flow field plate may be a solid plate in which case product water removal is accomplished by evaporation and entrainment as are known.

The cathode water transport plate 21 has oxidant reactant gas flow fields, such as air flow fields 31, and the anode water transport plate 28 has fuel reactant gas flow fields 32.

A typical anode substrate 14 is fabricated with long fiber PAN (polyacrylonitrile) based carbon fibers and has a thermal conductivity of about 1.2 watts per meter per degree C. (W/m° C.). The thickness of the anode substrate 14 is typically about 0.18 mm; the thermal conductance of such a substrate is therefore $6.7 \times 10^3$ W/m$^{2\circ}$ C. Accordingly, with the invention, the thermal conductance of the cathode including the catalyst 10, the diffusion layer 16 (if one is used) and the substrate 17, should therefore be less than about $3.3 \times 10^3$ W/m$^{2\circ}$ C., and more preferably, should be less than $1.7 \times 10^3$ W/m$^{2\circ}$ C.

A simple way of causing the decreased thermal conductance of the cathode is to increase the thickness of the material: a thickness of 0.36 mm would result in a thermal conductance of $3.3 \times 10^3$ W/m$^{2\circ}$ C. However, the increased thickness might impede flow of oxidant reactant, particularly at the highest current densities. Therefore, the thickness of the anode substrate could be reduced, instead, to 0.09 mm, to achieve the same thermal conductance relationship of at least two to one (cathode to anode).

On the other hand, it might be preferable to alter either the anode or cathode substrates by changing the heat treat temperature of the material, or altering the polymer content of the carbon black layers. Thermal conductivity of the substrates can be increased by using a pitch based carbon fiber rather than a PAN based carbon fiber, or by using short milled fibers (on the order of 0.25 mm to 0.50 mm) in place of using longer, chopped fibers (on the order of 5.0 mm to 10.0 mm). In the case of the catalyst layer or the diffusion layer (bi-layer) the thermal conductivity may be changed by using carbon blacks with different structure indexes or different heat treat temperatures.

Figure 2:
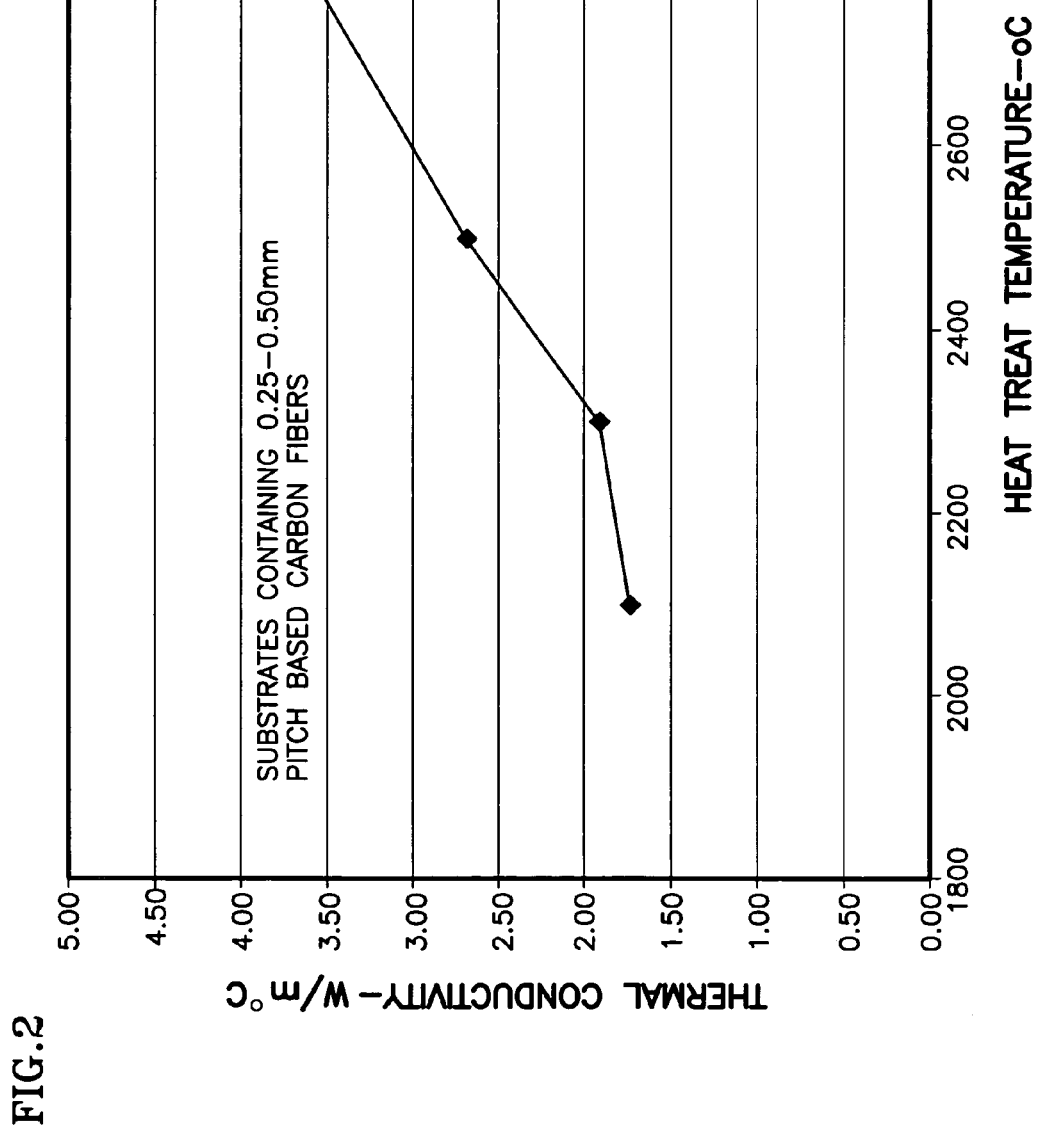
FIG. 2 is a graph of conductivity versus heat treat temperature.

Substrates that were made from 0.25-0.50 mm pitch based carbon fibers were heat treated at temperatures between 2100° C. and 3000° C. The thermal conductivities of these substrates were measured and are shown in FIG. 2. The thermal conductivity of a substrate heat treated at 3000° C. is 2.5 times greater than that for the same substrate heat treated at 2100° C. Similar results may be obtained with PAN based carbon fibers.

With the invention, water not only migrates to the anode (arrow 36, FIG. 1) but also enhances flow to a cathode water transport plate (arrow 38).

The invention obviates the need for water circulation pumps, but may be used with low power water pumps and/or low power reactant gas pumps, if desired.

All of the aforementioned patents and patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

The invention claimed is:

1. A fuel cell for a fuel cell power plant which converts hydrogen and oxygen into electricity, heat and water, comprising:
   a polymer electrolyte, proton exchange membrane (PEM);
   a cathode catalyst on a first surface of said PEM;
   an anode catalyst on a second surface of said PEM opposite to said first surface;
   a porous cathode substrate adjacent to said cathode catalyst;
   a porous anode substrate adjacent to said anode catalyst and having a through-plane thermal conductance;
   a flow field plate having oxidant reactant gas flow field channels therein adjacent to said cathode substrate;
   a flow field plate having fuel reactant gas flow field channels therein adjacent to said anode substrate;
   characterized by the improvement comprising:
   said cathode substrate having a through-plane thermal conductance which is less than about one-half of through-plane thermal conductance of the anode substrate.

2. A fuel cell according to claim 1 wherein the thermal conductance of said anode substrate is about $6.7 \times 10^3$ W/m$^{2\circ}$ C. and the thermal conductance of said cathode substrate is about $3.3 \times 10^3$ W/m$^{2\circ}$ C.

3. A fuel cell for a fuel cell power plant which converts hydrogen and oxygen into electricity, heat and water, comprising:
   a polymer electrolyte, proton exchange membrane (PEM);
   a cathode catalyst on a first surface of said PEM;
   an anode catalyst on a second surface of said PEM opposite to said first surface;
   a porous cathode substrate adjacent to said cathode catalyst and having thickness and through-plane conductance;
   a porous anode substrate adjacent to said anode catalyst and having thickness and through-plane conductance;
   a flow field plate having oxidant reactant gas flow field channels therein adjacent to said cathode substrate;
   a flow field plate having fuel reactant gas flow field channels therein adjacent to said anode substrate;
   characterized by the improvement comprising:
   the cathode substrate thickness is not more than about twice the anode substrate thickness, and the through-plane thermal conductance of the cathode substrate is less than about one-half of the through-plane thermal conductance of the anode substrate.

4. A fuel cell according to claim 3 wherein the thermal conductance of said anode substrate is about $6.7\times10^3$ W/m²° C. and the thermal conductance of said cathode substrate is about $1.7\times10^3$ W/m²° C.

5. A fuel cell according to any of claims 1 to 4 further comprising:
   a diffusion layer between the catalyst and the substrate of at least one of the anode and the cathode.

6. A fuel cell according to any of claims 1 to 4 wherein:
   each substrate is selected from hydrophobic substrates, partially hydrophobic substrates, and hydrophilic substrates.

7. A fuel cell according to any of claims 1 to 4 wherein: each flow field plate is selected from porous water transport plates and solid flow field plates.

8. A fuel cell according to claim 3 wherein the thermal conductance of the cathode substrate is less than about one quarter of said through-plane thermal conductance of the anode substrate.

9. A fuel cell according to claim 3 wherein the thermal conductance of said anode substrate is about $6.7\times10^3$ W/m²° C. and the thermal conductance of said cathode substrate is about $3.3\times10^3$ W/m²° C.

* * * * *

UNITED STATES PATENT AND TRADEMARK OFFICE
CERTIFICATE OF CORRECTION

PATENT NO.        : 7,429,429 B2                                      Page 1 of 1
APPLICATION NO.   : 10/859014
DATED             : September 30, 2008
INVENTOR(S)       : Richard D. Breault It is certified that error appears in the above-identified patent and that said Letters Patent is hereby corrected as shown below:

On the Title Page, Item (54)
    The title should read --FUEL CELL WITH THERMAL CONDUCTANCE OF ANODE GREATER THAN CATHODE--.

Signed and Sealed this

Sixth Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,429,429 B2
APPLICATION NO. : 10/859014
DATED : September 30, 2008
INVENTOR(S) : Richard D. Breault It is certified that error appears in the above-identified patent and that said Letters Patent is hereby corrected as shown below:

On the Title Page, Item (54) and Column 1, lines 1-3,
The title should read --FUEL CELL WITH THERMAL CONDUCTANCE OF ANODE GREATER THAN CATHODE--.

This certificate supersedes the Certificate of Correction issued October 6, 2009.

Signed and Sealed this

Twenty-seventh Day of October, 2009

David J. Kappos
*Director of the United States Patent and Trademark Office*